US012756785B2

(12) United States Patent
Omura

(10) Patent No.: US 12,756,785 B2
(45) Date of Patent: Oct. 6, 2026

(54) IMAGE FORMING APPARATUS, CONTROL METHOD, AND NON-TRANSITORY COMPUTER-READABLE RECORDING MEDIUM

(71) Applicant: Konica Minolta, Inc., Tokyo (JP)

(72) Inventor: Kunihiko Omura, Toyohashi (JP)

(73) Assignee: Konica Minolta, Inc., Tokyo (JP)

( * ) Notice: Subject to any disclaimer, the term of this patent is extended or adjusted under 35 U.S.C. 154(b) by 50 days.

(21) Appl. No.: 18/589,933

(22) Filed: Feb. 28, 2024

(65) Prior Publication Data

US 2024/0297944 A1 Sep. 5, 2024

(30) Foreign Application Priority Data

Mar. 1, 2023 (JP) ................................ 2023-030637

(51) Int. Cl.
*H04N 1/00* (2006.01)
*G06F 8/65* (2018.01)

(52) U.S. Cl.
CPC ........... *H04N 1/00891* (2013.01); *G06F 8/65* (2013.01); *H04N 1/00488* (2013.01); *H04N 1/0049* (2013.01)

(58) Field of Classification Search
CPC ........ G06F 8/65; G06F 3/1221; G06F 3/1229; G06F 3/123; H04N 1/00488; H04N 1/0049
USPC .................................................. 713/320, 323
See application file for complete search history.

(56) References Cited

U.S. PATENT DOCUMENTS 9,312,901 B2 * 4/2016 Park ..................... H04B 1/3816
2008/0007486 A1 * 1/2008 Fujinawa ............. G02F 1/1347 345/5
2012/0180034 A1 * 7/2012 Hatamoto ................ G06F 8/65 717/168
2012/0272084 A1 * 10/2012 Tsuji .................... G06F 1/3284 713/324
2014/0068592 A1 * 3/2014 Chitre ....................... G06F 8/65 717/171
2015/0007161 A1 * 1/2015 Yagi .......................... G06F 8/65 717/171
(Continued)

FOREIGN PATENT DOCUMENTS

JP S58-87561 A 5/1983
JP H07-225661 A 8/1995
(Continued)

OTHER PUBLICATIONS

Office Action issued in counterpart Japanese Patent Application No. 2023-030637 mailed Jun. 2, 2026 (21 pages).

*Primary Examiner* — Jaweed A Abbaszadeh
*Assistant Examiner* — Cheri L Harrington
(74) *Attorney, Agent, or Firm* — Osha Bergman Watanabe & Burton LLP

(57) ABSTRACT

An image forming apparatus includes a main power supply switch that turns on and off a main power supply, a battery that is a power source different from the main power supply, a detector that detects switching of the main power supply switch, and a first hardware processor that operates with power supplied from the battery, and provides a notification in response to the detector detecting the switching of the main power supply switch from on to off.

14 Claims, 9 Drawing Sheets

(56) References Cited

U.S. PATENT DOCUMENTS

| | | | | |
|---|---|---|---|---|
| 2015/0042572 | A1* | 2/2015 | Lombardi | G06F 3/0488 345/173 |
| 2015/0146235 | A1* | 5/2015 | Sekine | G06K 15/4055 358/1.14 |
| 2015/0188609 | A1* | 7/2015 | Inoue | H04B 5/79 455/552.1 |
| 2016/0291666 | A1* | 10/2016 | Hosoya | G06F 1/3212 |
| 2017/0006171 | A1* | 1/2017 | Kaneko | H04N 1/00042 |
| 2020/0065087 | A1* | 2/2020 | Miura | H04L 67/34 |
| 2022/0261236 | A1* | 8/2022 | Ogawa | G06F 8/654 |
| 2024/0231716 | A1* | 7/2024 | Koujiro | G06F 3/1285 |

FOREIGN PATENT DOCUMENTS

| | | | |
|---|---|---|---|
| JP | 2010-125726 | A | 6/2010 |
| JP | 2014-021678 | A | 2/2014 |
| JP | 2016143305 | A | 8/2016 |
| JP | 2017-087602 | A | 5/2017 |
| JP | 2017-228275 | A | 12/2017 |
| JP | 2020-030607 | A | 2/2020 |

* cited by examiner

IMAGE FORMING APPARATUS, CONTROL METHOD, AND NON-TRANSITORY COMPUTER-READABLE RECORDING MEDIUM

CROSS REFERENCE TO RELATED APPLICATIONS

The present application is based on JP2023-030637 filed on Mar. 1, 2023, the contents of which are incorporated herein by reference.

BACKGROUND

Technical Field

The present invention relates to an Image Forming Apparatus, a Control Method, and a Non-Transitory Computer-Readable Recording Medium. In particular, the present invention relates to a technique for responding to switching of a main power supply switch of the image forming apparatus from on to off by a user.

Description of Related Art

An image forming apparatus such as a multifunction peripheral (MFP) updates firmware regularly or irregularly in order to improve quality. The firmware is updated by providing a firmware update instruction from an external server to the image forming apparatus. That is, the image forming apparatus updates the firmware by executing the firmware update instruction provided from the server.

A user is not allowed to use the image forming apparatus during firmware update. Therefore, the firmware update timing is usually set outside the business hours of the office where the image forming apparatus is installed. However, if a user inadvertently turns off the main power supply switch of the image forming apparatus when the user leaves the office, the firmware of the image forming apparatus cannot be updated. Currently, such a case occurs in about 10% of the total number of firmware update targets.

Conventionally, in order to appropriately notify a user that firmware needs to be updated, it has been proposed to display an update notification image when the user is using an apparatus, and not to display the update notification image when the user is not using the apparatus and a backlight of a display apparatus is off (e.g., Patent Literature 1: JP2016-143305A).

In the conventional technology of Patent Literature 1, an update notification screen is displayed when a user uses an apparatus. However, the user does not always see the update notification screen when he/she tries to turn off the main power supply switch of the image forming apparatus at the time of leaving the office. Therefore, the user may turn off the main power supply switch without noticing the update notification screen. Furthermore, when the user is not using the apparatus, the update notification screen is not displayed. Therefore, it could happen that the user inadvertently turns off the main power supply switch of the image forming apparatus when leaving the office.

The following may occur due to the main power supply switch being turned off in addition to the matter regarding firmware updates. For example, if the main power supply switch is turned off by another user while the image forming apparatus is receiving a print job of a specific user with a large number of printed sheets via the network, the print job being received cannot be executed. Further, if the main power supply switch is turned off by another user when a reserved job of a specific user is registered in the image forming apparatus, the image forming apparatus cannot execute the reserved job at the reserved job execution date and time.

On the other hand, when the main power supply switch is turned off by the user, the main power supply has already been shut off, so that it is not possible to perform processing for prompting the user to turn on the main power supply switch.

SUMMARY

One or more embodiments of the present invention provide an image forming apparatus, a control method, and a non-transitory computer-readable recording medium storing instructions that make it possible to, in a case where a main power supply switch has been switched from on to off by a user, prompt the user to turn on the main power supply switch.

In order to achieve the above purpose, first, one or more embodiments of the present invention provide an image forming apparatus.

In one aspect of the present invention, the image forming apparatus includes a main power supply switch that turns on and off a main power supply, a battery that is a power source different from the main power supply, a detector that detects switching of the main power supply switch, and a first hardware processor that operates with power supplied from the battery. The first hardware processor provides a notification in response to the detector detecting the switching of the main power supply switch from on to off.

Second, one or more embodiments of the present invention provide a control method for an image forming apparatus that comprises: a main power supply switch that turns on and off a main power supply, a battery that is a power source different from the main power supply, and a detector that detects switching of the main power supply switch.

In one aspect of the present invention, the method comprises: providing a notification with power supplied from the battery in response to the detector detecting the switching of the main power supply switch from on to off.

Third, one or more embodiments of the present invention provide a non-transitory computer-readable recording medium storing instructions to be executed by a hardware processor in an image forming apparatus comprising: a main power supply switch that turns on and off a main power supply, a battery that is a power source different from the main power supply, and a detector that detects switching of the main power supply switch. The hardware processor operates with power supplied from the battery.

In one aspect of the present invention, the instructions cause the hardware processor to provide a notification in response to the detector detecting the switching of the main power supply switch from on to off.

BRIEF DESCRIPTION OF THE DRAWINGS

The advantages and features provided by one or more embodiments of the invention will become more fully understood from the detailed description given herein below and the appended drawings which are given by way of illustration only, and thus are not intended as a definition of the limits of the present invention.

DETAILED DESCRIPTION OF EMBODIMENTS

Figure 1:
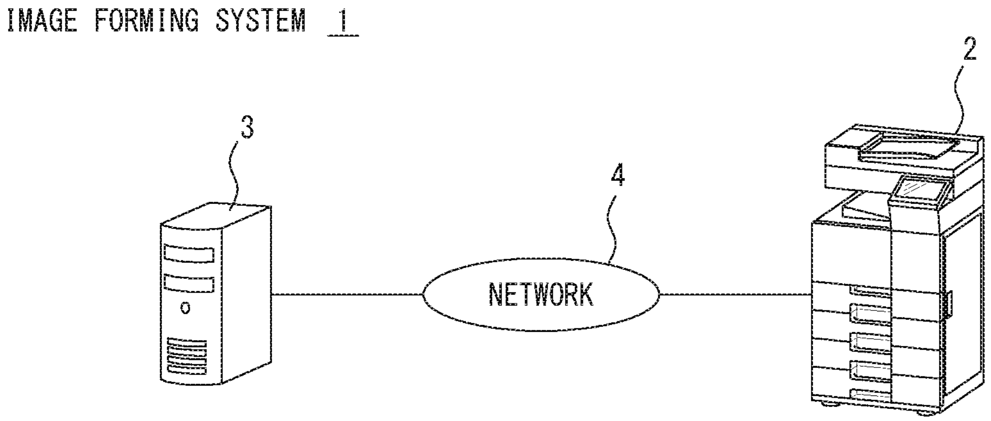
FIG. 1 illustrates an example of a configuration of an image processing system.

Hereinafter, embodiments of the present invention will be described with reference to the drawings. However, the scope of the invention is not limited to the disclosed embodiments.

Hereinafter, embodiments of the present invention will be described in detail with reference to the drawings. Elements common to each other in the embodiments described below are denoted by the same reference numerals, and redundant description thereof is omitted.

Embodiments of the present invention will be described. FIG. 1 illustrates an example of a configuration of an image processing system 1. The image processing system 1 is a network system including an image forming apparatus 2 such as an MFP and a server 3, which are connected to a network 4. The network 4 is a network including a local area network (LAN), the Internet, and the like.

The image forming apparatus 2 has multiple functions such as a copy function, a scan function, a print function, and a FAX function. The image forming apparatus 2 executes a job specified by a user. For example, when the image forming apparatus 2 receives a print job from another computer via the network 4, the image forming apparatus 2 performs print output based on the print job. Furthermore, the image forming apparatus 2 executes a copy job, a scan job, a FAX job, and the like in addition to the print job. For example, the image forming apparatus 2 is installed in an office and is shared by a plurality of users who work in the office.

The server 3 is an apparatus that updates the firmware of the image forming apparatus 2 from a remote location via the network 4. For example, the server 3 is installed on a cloud via the Internet. The server 3 manages versions of firmware of a plurality of image forming apparatuses 2 installed at various sites. When a new version of firmware is released, the server 3 provides a firmware update instruction to the image forming apparatuses 2 installed at the respective sites. The image forming apparatus 2 updates the firmware by receiving and executing the firmware update instruction provided from the server 3.

When the image forming apparatus 2 is updating the firmware, the user cannot use the image forming apparatus 2. For this reason, the server 3 transmits the firmware update instruction to the image forming apparatus 2 in a time zone (for example, midnight) in which business in the office is not performed, and updates the firmware of the image forming apparatus 2.

Figure 2:
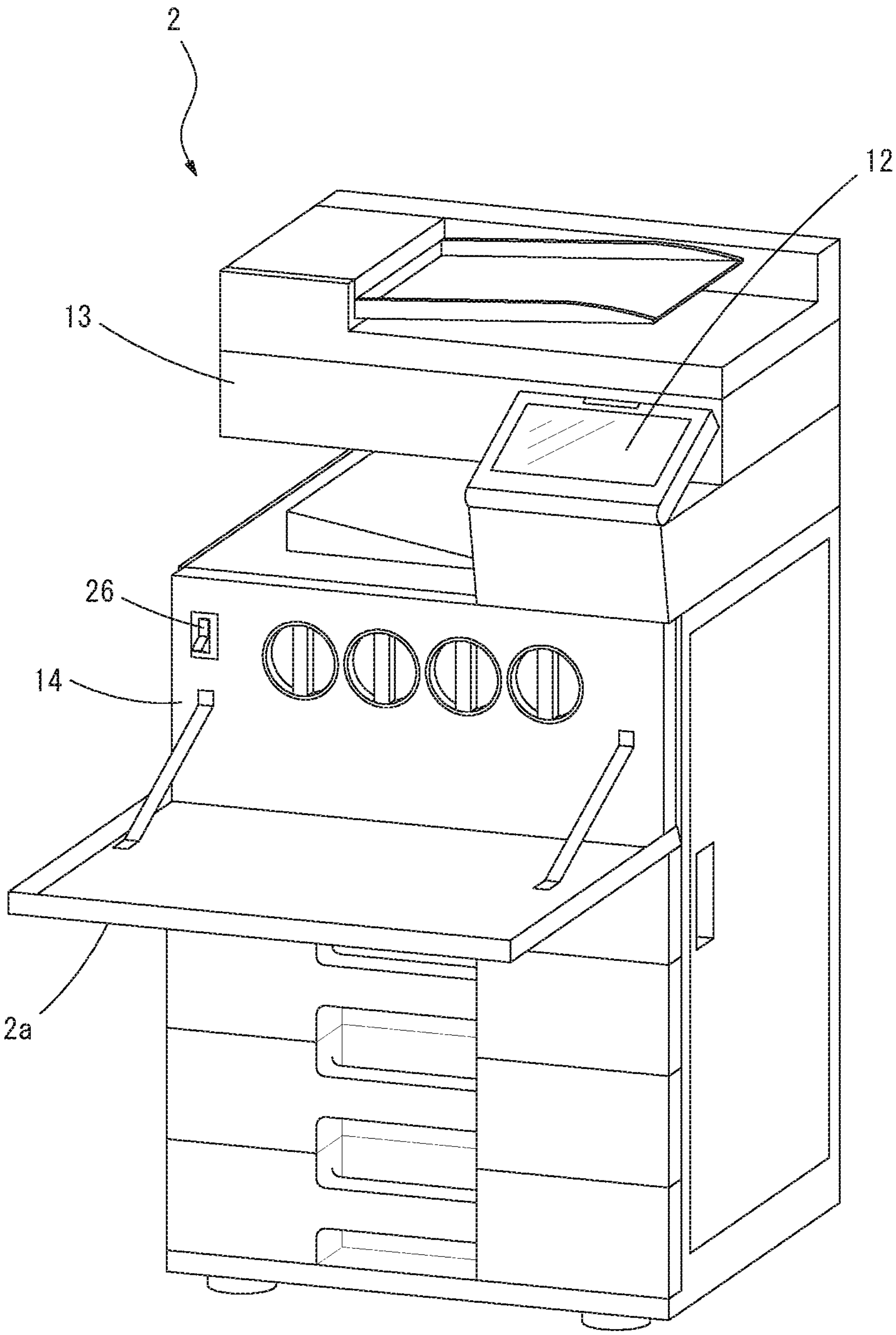
FIG. 2 illustrates an example of an external configuration of the image forming apparatus

FIG. 2 illustrates an example of an external configuration of the image forming apparatus 2. FIG. 2 illustrates a state in which the front door 2*a* of the image forming apparatus 2 is opened forward. The image forming apparatus 2 includes a scanner section (or a scanner) 13 in an upper portion of an apparatus body and a printer section (or a printer) 14 in a lower portion of the apparatus body.

The scanner section 13 generates image data by optically reading an image of a document set by a user. For example, the scanner section 13 includes an image reading section (or image reader) that reads an image of a document and an automatic document conveying section (or automatic document conveyor) that is installed above the image reading section. The image reading section and the automatic document feeder can operate in conjunction with each other to perform continuous automatic reading of multiple sheets of document.

The printer section 14 conveys a sheet specified by the user, forms an image based on image data to be printed on the sheet, and outputs the sheet. For example, the printer section 14 forms a toner image on a sheet by an electrophotographic method, and fixes and outputs the toner image on the sheet. As illustrated in FIG. 2, in the image forming apparatus 2, a toner bottle filled with toner can be replaced by opening the front door 2*a*.

The image forming apparatus 2 includes an operation panel 12 on an upper front side of the apparatus main body. The operation panel 12 is a user interface for a user to use the image forming apparatus 2. For example, the operation panel 12 includes a display section (or display) that displays an operation screen operable by a user and an operation section (or operation part) that receives an operation by the user. The image forming apparatus 2 can perform various settings, execution of a job, and the like based on a user operation performed on the operation panel 12.

Furthermore, the image forming apparatus 2 includes, on the front side of the apparatus main body, a main power supply switch 26 that can be operated by a user when the front door 2*a* is opened. The main power supply switch 26 is a switch for switching on and off the supply of power from a main power supply such as a commercial power supply. The position where the main power supply switch 26 is provided is not limited to the front side of the apparatus main body as illustrated in FIG. 2. For example, the main power supply switch 26 may be provided on the side surface side of the apparatus main body, or may be provided on the rear surface side. In any case, the main power supply switch 26 is provided at a position where a user does not erroneously operate the main power supply switch 26.

In order for a user to use the image forming apparatus 2, the main power supply switch 26 needs to be in an on state. On the other hand, when the main power supply switch 26 is in an on state while the image forming apparatus 2 is not being used by a user, standby power is consumed in the image forming apparatus 2. Therefore, depending on the policy of the office in which the image forming apparatus 2 is installed, the main power supply switch 26 of the image forming apparatus 2 may be turned off after the end of the business hours in order to save power.

Figure 3:
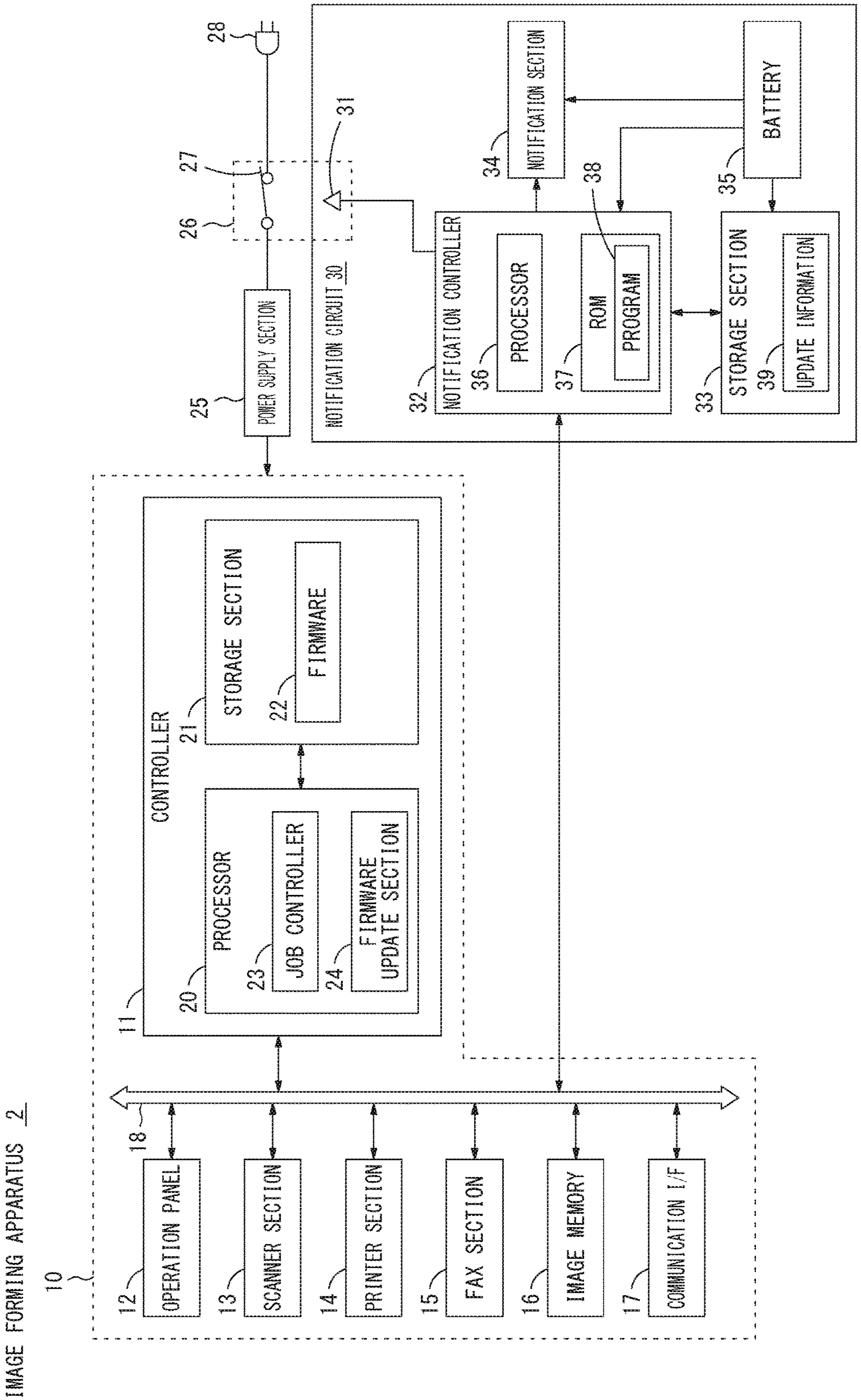
FIG. 3 illustrates an example of a hardware configuration and a functional configuration of the image forming apparatus

FIG. 3 illustrates an example of a hardware configuration and a functional configuration of the image forming apparatus 2. The image forming apparatus 2 includes a main configuration part 10 for executing a job and a power supply section (or power supply) 25 for supplying power to the main configuration part 10. A power plug 28 is connected to the power supply section 25 via a main power supply switch 26. When the main power supply switch 26 is turned on in a state where the power plug 28 is inserted into the power socket in the office, the main power supply is supplied to the power supply section 25. The power supply section 25 supplies the main power supply to the main configuration part 10. As a result, the main configuration part 10 becomes operable.

The main configuration part 10 includes a controller 11, an operation panel 12, a scanner section (or scanner) 13, a printer section (or printer) 14, a FAX section (or FAX) 15, an image memory 16, and a communication interface 17, and these sections can mutually input and output data via a bus 18.

The controller 11 includes a processor 20 and a storage section (or a storage) 21, and controls the operation of each section. The FAX section 15 transmits and receives FAX data via a public telephone line or the like. The image memory 16 is a memory that temporarily stores image data. For example, the image memory 16 temporarily stores image data generated by the scanner section 13, image data to be printed by the printer section 14, and the like. The communication interface 17 is an interface that connects the image forming apparatus 2 to the network 4, and includes, for example, a network interface card (NIC).

The storage section 21 of the controller 11 stores firmware 22. The processor 20 is a hardware processor including a central processing unit (CPU) and the like. The processor 20 functions as a job controller 23 and a firmware update section 24 by reading and executing the firmware 22.

The job controller 23 controls execution of a job in image forming apparatus 2. For example, the job controller 23 makes settings related to a job based on a user's setting operation on the operation panel 12. Upon detection of a user's instruction to execute a job, the job controller 23 controls execution of the job specified by the user. Furthermore, for example, when receiving a print job via the communication interface 17, the job controller 23 develops image data included in the print job in the image memory 16. Thereafter, the job controller 23 activates the printer section 14 to produce a printed output based on the image data developed in the image memory 16.

When the controller 11 is operating by being supplied with power from the main power supply, the firmware update section 24 can communicate with the server 3 via the communication interface 17. Upon receiving the firmware update instruction provided from the server 3, the firmware update section 24 executes the firmware update instruction to update the firmware 22 stored in the storage section 21.

Furthermore, before the firmware update instruction is provided from the server 3, the firmware update section 24 acquires the update information that specifies the update timing of the firmware 22. For example, the update information may be information that is input from the operation panel 12 by a user or an administrator, or may be information that is transmitted from the server 3 to the image forming apparatus 2.

The image forming apparatus 2 according to one or more embodiments further includes a notification circuit 30. The notification circuit 30 monitors the main power supply switch 26 when a predetermined processing such as a firmware update is scheduled in the image forming apparatus 2, and provides notification to an outside of the image forming apparatus 2 (toward the user of the image forming apparatus 2) when the main power supply switch 26 is switched from on to off. In response to the main power supply switch 26 being switched from on to off while the predetermined processing is scheduled in the image forming apparatus 2, the main power supply is no longer supplied to the main configuration part 10. Therefore, the controller 11 does not operate, and the scheduled predetermined processing cannot be performed. Therefore, the notification circuit 30 monitors the main power supply switch 26 and provides a notification to the outside when the main power supply switch 26 is switched from on to off by the user. The user who has switched off the main power supply switch 26 can quickly switch on the main power supply switch 26 again by the notification from the notification circuit 30.

The notification circuit 30 includes a detector 31, a notification controller 32, a storage section (or a storage) 33, a notification section (or notification unit) 34, and a battery 35. The battery 35 is a battery that supplies power to each part of the notification circuit 30, and is constituted by a primary battery, for example. Providing the battery 35 in the notification circuit 30 allows the notification circuit 30 to operate with power supplied from the battery 35 even when the main power supply switch 26 is off.

The detector 31 includes a sensor that detects switching of the main power supply switch 26. For example, the detector 31 detects the position of the movable contact 27 of the main power supply switch 26, and detects whether the main power supply switch 26 is in an on state or an off state. The detector 31 may detect the state of the main power supply switch 26 with a contact sensor or may detect the state of the main power supply switch 26 with a noncontact sensor. The detector 31 outputs a detection result of the state of the main power supply switch 26 to the notification controller 32.

The notification controller 32 controls a notification operation to the outside based on a detection result by the detector 31. The notification controller 32 includes a processor 36 and a read only memory (ROM) 37. The processor 36 is a hardware processor including a central processing unit (CPU) and the like. The instructions such as a program 38 to be executed by the processor 36 is stored in the memory ROM37 in advance. The processor 36 reads and executes the instructions from the ROM37, thereby causing the notification controller 32 to function.

The notification controller 32 is also connected to the bus 18 of the configuration part 10. The notification controller 32 can communicate with the components of the configuration part 10 via the bus 18. For example, the notification controller 32 can communicate with the controller 11 when the main configuration part 10 is operated with power supply from the main power supply. In contrast, when the main power supply switch 26 is off and the supply of power from the main power supply is interrupted, the notification controller 32 cannot communicate with the controller 11 via the bus 18.

The storage section 33 is a memory in which information can be rewritten and which can continue to hold the stored information with power supply from the battery 35. The storage section 33 stores, for example, update information 39 specifying an update timing of the firmware 22. The notification controller 32 grasps the update timing of the firmware 22 by referring to the update information 39 stored in the storage section 33.

For example, when the firmware update section 24 of the controller 11 acquires the update information 39 while operating on power supplied from the main power supply, the firmware update section 24 outputs the update information 39 to the notification controller 32. Upon acquiring the update information 39 from the firmware updating section

24 of the controller 11, the notification controller 32 stores the update information 39 in the storage section 33.

Storing the update information 39 in the storage section 33 allows the notification controller 32 to recognize that the firmware 22 is scheduled to be updated in the image forming apparatus 2. Therefore, the notification controller 32 starts the monitoring operation of the main power supply switch 26 at a predetermined timing before the update timing of the firmware 22. When the main power supply switch 26 is switched from on to off within a predetermined time before the update timing based on the detection result by the detector 31, the notification controller 32 activates the notification section 34 to start a notification operation to the outside.

The notification section 34 provides a notification to the outside based on the instruction from the notification controller 32. The notification by the notification section 34 is a kind of warning for the main power supply switch 26 being switched off. When the main power supply switch 26 is switched from on to off by the user, the notification section 34 makes a notification to the surroundings of the image forming apparatus 2, thereby prompting the user to turn on the main power supply switch 26.

Figure 4:
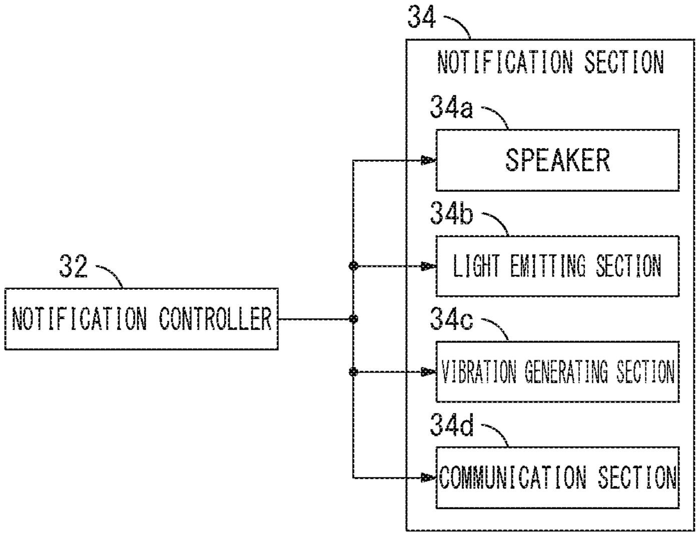
FIG. 4 illustrates a configuration example of a notification controller.

FIG. 4 illustrates an example of a configuration of the notification section 34. For example, the notification section 34 includes the speaker 34*a*, a light emitting section (light emitter) 34*b*, a vibration generating section (vibrator) 34*c*, and a communication section (or communication interface) 34*d*. However, the notification section 34 does not need to include all of the speaker 34*a*, the light emitting section 34*b*, the vibration generating section 34*c*, and the communication section 34*d*, and may include at least one of them.

The speaker 34*a* generates sound in the surroundings based on an instruction from the notification controller 32. For example, the speaker 34*a* outputs a warning sound such as a beep sound. Furthermore, the speaker 34*a* may output a voice such as "firmware is scheduled to be updated" or "please turn on the main power supply switch".

The light emitting section 34*b* includes light sources such as light emitting diodes (LEDs). The light emitting section 34*b* is disposed, for example, near the operation panel 12, on the front side of the apparatus main body of the image forming apparatus 2, on the front side of the scanner section 13, or the like, and is disposed at a position where a user who has switched off the main power supply switch 26 can easily view the light emitting section 34*b*. The light emitting section 34*b* emits light to the outside of the image forming apparatus 2 by turning on or blinking the light source based on an instruction from the notification controller 32.

The vibration generating section 34*c* is configured of, for example, eccentric motors or piezoelectric vibration actuators. The vibration generating section 34*c* outputs a vibration sound to the outside of the image forming apparatus 2 by generating vibration based on an instruction from the notification controller 32.

The communication section 34*d* performs notification to a pre-specified external device by communicating with the external device. For example, the communication section 34*d* is connected to the network 4, and notifies the external device via the network 4 that the main power supply switch 26 has been turned off. At this time, the communication section 34*d* may perform the notification by transmitting an electronic mail to an address designated in advance. The address designated in advance may be an address of an administrator of the image forming apparatus 2 or an address of the server 3.

Alternatively, the communication section 34*d* may perform wireless communication with a smartphone or other portable device carried by the user who has turned off the main power supply switch 26 to provide a notification to the user. In this case, the communication section 34*d* should be able to perform one to one wireless communication with portable terminals within a predetermined range of distances from the image forming apparatus 2.

Due to the notification by the notification section 34, the user who has turned off the main power supply switch 26 notices that the main power supply switch 26 should not be turned off. Therefore, the user can turn on the main power supply switch 26 again immediately after turning off the main power supply switch 26.

Further, in a case where the administrator of the image forming apparatus 2 or the server 3 receives the notification by the communication section 34*d*, it is possible to grasp at an early stage that there is a possibility that the firmware 22 of the image forming apparatus 2 cannot be updated. Therefore, the administrator can take some action by the update timing of the firmware 22.

Figure 5:
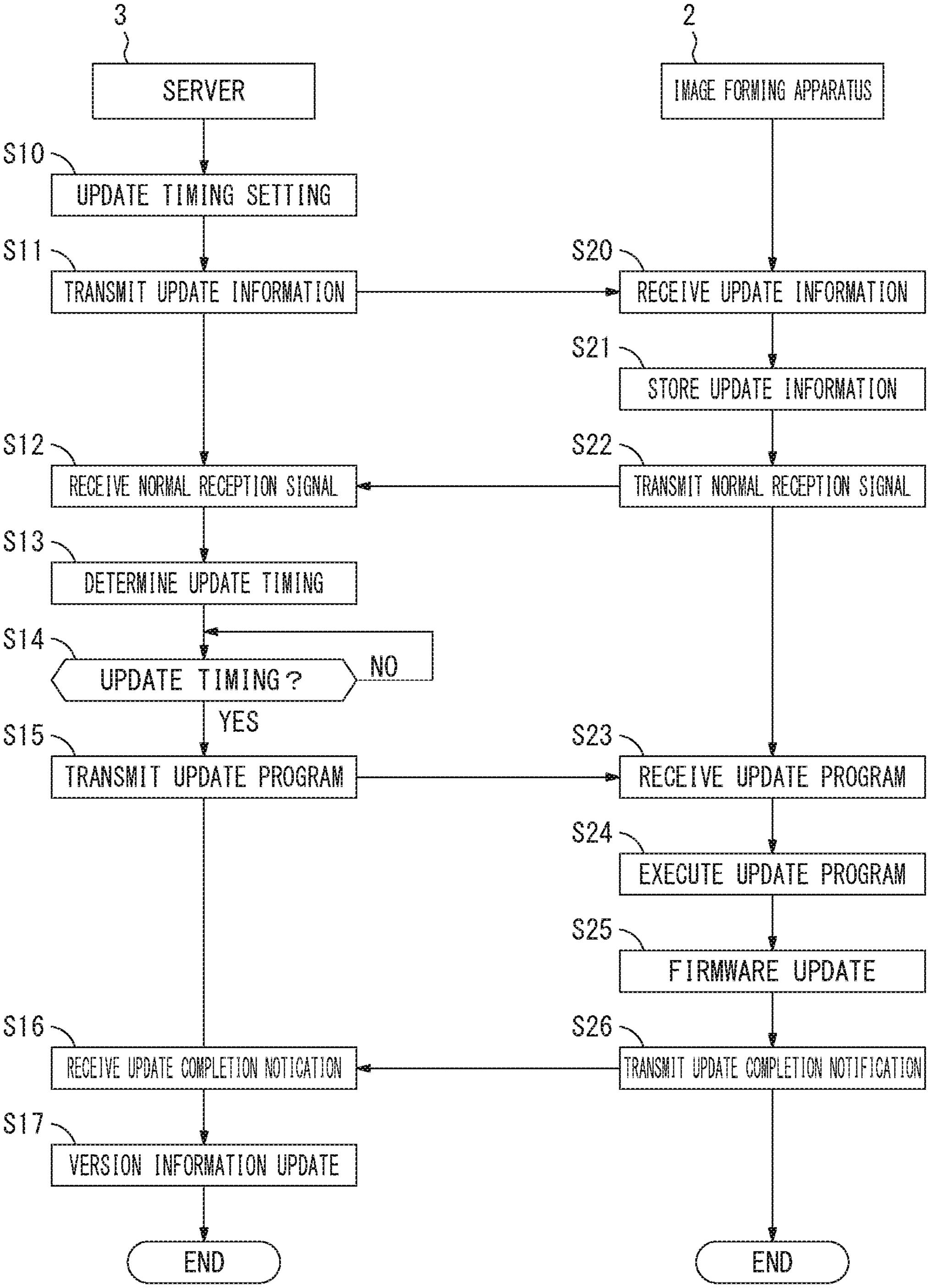
FIG. 5 is a flowchart for a server and an image forming apparatus to update firmware cooperatively.

FIG. 5 is a flowchart for the server 3 and the image forming apparatus 2 to update the firmware 22 in cooperation with each other. Note that FIG. 5 illustrates an example in which the update information 39 is transmitted from the server 3 to the image forming apparatus 2.

When the firmware 22 of the new version for the image forming apparatus 2 is released, the server 3 sets the update timing of the firmware 22 in the image forming apparatus 2 based on the administrator's instruction (step S10). When the update timing is set, the server 3 generates update information 39 designating the update timing, and transmits the update information 39 to the image forming apparatus 2 (step S11). Note that the transmission of the update information 39 is performed within the working hours of the office in which the image forming apparatus 2 is installed.

Upon receiving the update information 39 transmitted from the server 3 (step S20), the image forming apparatus 2 stores the update information 39 in the storage section 33 of the notification circuit 30 (step S21). Thus, the notification controller 32 can specify the update timing of the firmware 22 based on the update information 39 in the storage section 33. Upon storing the update information 39 in the storage section 33, the image forming apparatus 2 transmits a normal reception signal to the server 3 (step S22). For example, the normal reception signal is transmitted to the server 3 by the firmware update section 24.

Upon receiving the normal reception signal from the image forming apparatus 2 (step S12), the server 3 determines the update timing set in step S10 (step S13). The server 3 executes the processing of step S14 and subsequent steps by determining the transmission timing.

After determining the update timing, the server 3 waits until the update timing (NO in step S14). For example, the update timing is set in a time zone other than business hours of an office in which the image forming apparatus 2 is installed so as not to interfere with user's business. At update timing (YES in step S14), the server 3 transmits the firmware update instruction to the image forming apparatus 2 (step S15).

Upon receiving the firmware update instruction from the server 3 (step S23), the image forming apparatus 2 executes the firmware update instruction (step S24) and updates the firmware 22 (step S25). When the update processing of the firmware 22 ends, the image forming apparatus 2 transmits an update completion notification to the server 3 (step S26).

Upon receiving the update completion notification from the image forming apparatus 2 (step S16), the server 3 updates the version information of the firmware 22 of the image forming apparatus 2 managed by the server 3 (step S17), and all the processing ends.

In the description above, for example, if the main power supply switch 26 of the image forming apparatus 2 is off when the server 3 transmits the firmware update instruction to the image forming apparatus 2 (step S15), the firmware 22 of the image forming apparatus 2 cannot be updated. Therefore, the notification circuit 30 starts to operate after saving the update information 39 in step S21, and provides a notification when the main power supply switch 26 is switched from on to off by the user within a predetermined time before the update timing of the firmware 22.

Figure 6:
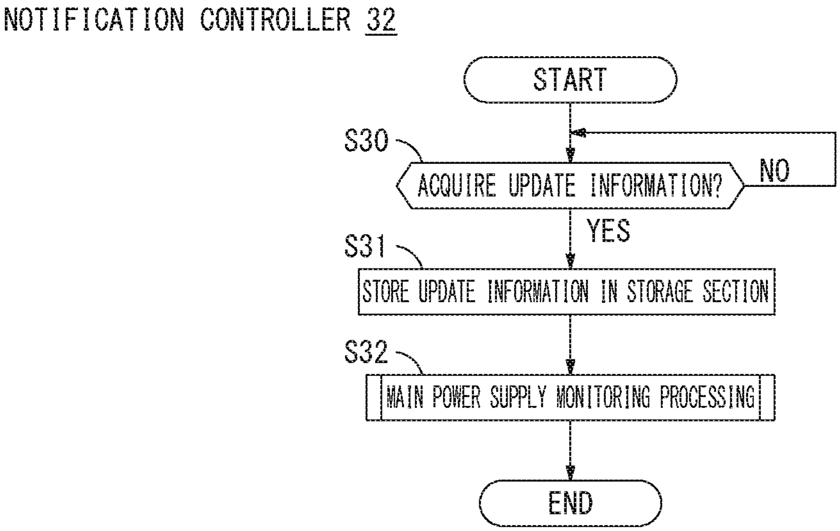
FIG. 6 is a flowchart illustrating an example of a processing procedure by a notification controller.
Figure 7:
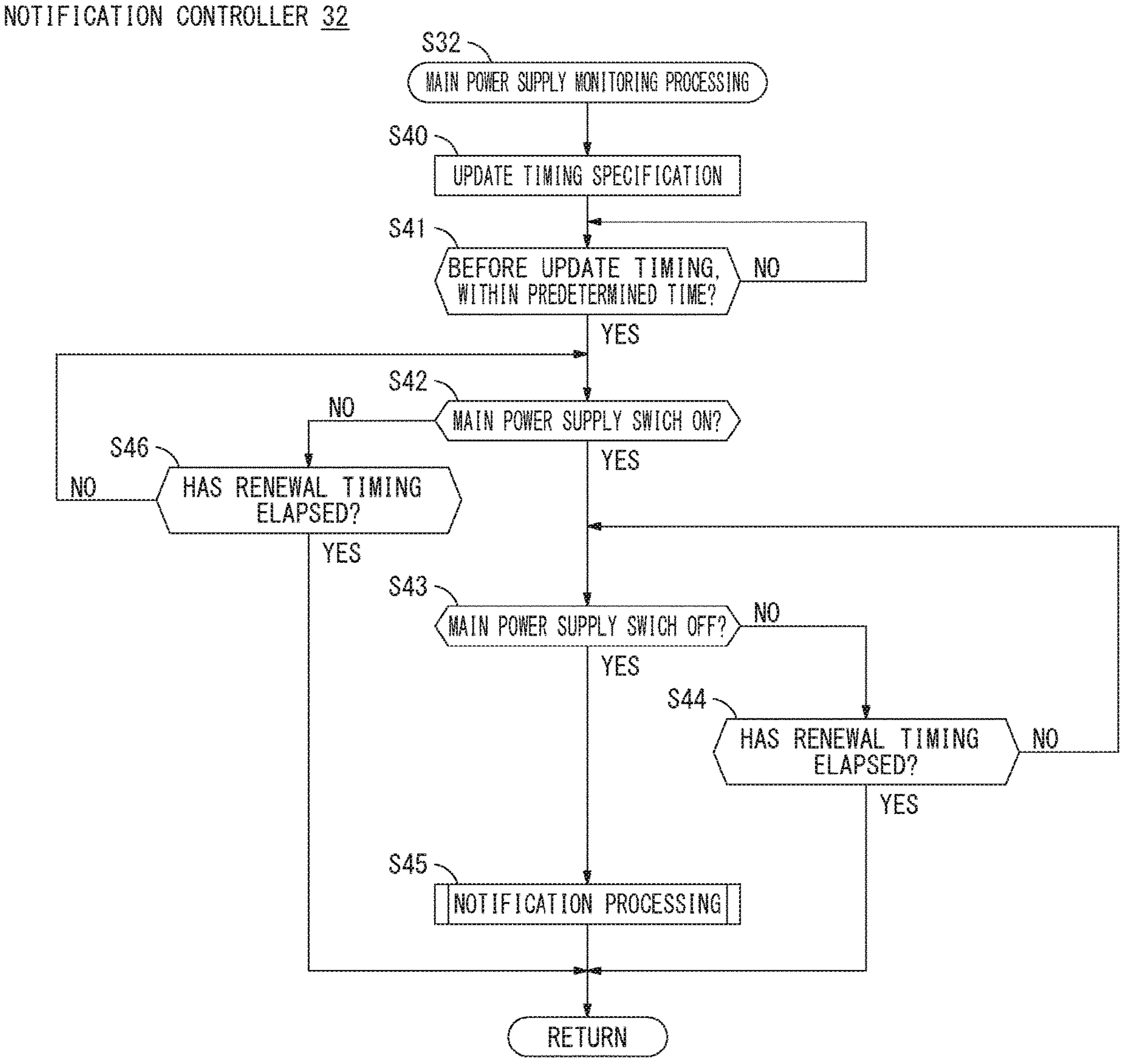
FIG. 7 is a flowchart illustrating an example of detailed processing procedure of the main power supply monitoring processing.
Figure 8:
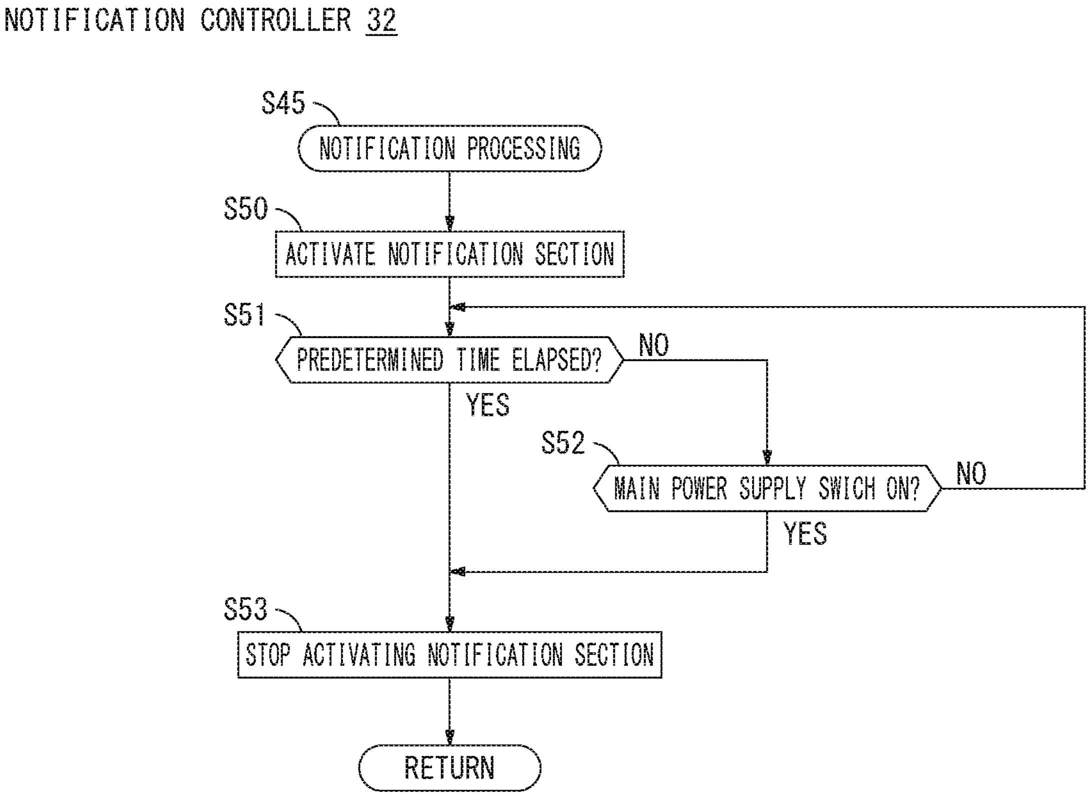
FIG. 8 is a flowchart illustrating an example of a detailed processing procedure of the notification processing.

FIGS. 6 to 8 are flowcharts illustrating an example of a processing procedure by the notification controller 32. The processing procedures illustrated in these flowcharts are performed by the processor 36 of the notification controller 32 executing the instructions.

As illustrated in FIG. 6, the notification controller 32 waits until the update information 39 output from the controller 11 is acquired (step S30). When the update information 39 is acquired (YES in step S30), the notification controller 32 stores the update information 39 in the storage section 33 (step S31). Upon storing the update information 39 in the storage section 33, the notification controller 32 starts the main power supply monitoring processing (step S1).

FIG. 7 is a flowchart illustrating an example of a detailed processing procedure of main power supply monitoring processing (step S32). When the notification controller 32 starts the main power supply monitoring process, the notification controller 32 refers to the update information 39 stored in the storage section 33 and specifies the update timing of the firmware 22 (step S40). When the update timing is specified, the notification controller 32 waits until the current time becomes a timing within a predetermined time before the update timing (step S41). That is, the notification controller 32 waits until the remaining time until the update timing reaches the predetermined time. The predetermined time period is a time period that can be arbitrarily set by an administrator or the like of the image forming apparatus 2. For example, when the predetermined time is set as 24 hours, the notification controller 32 waits until the remaining time to the update timing becomes 24 hours.

If the time remaining until the update timing reaches the predetermined time (YES in step S41), the notification controller 32 starts the processing in step S42 and subsequent steps. That is, the notification controller 32 starts the processing of monitoring whether or not the main power supply switch 26 has been switched from on to off within a predetermined time before the update timing of the firmware 22.

First, the notification controller 32 determines, based on the result of detection by the detector 31, whether the main power supply switch 26 is on (step S42). If the main power supply switch 26 is on (YES in step S42), the notification controller 32 then determines whether the main power supply switch 26 is off (step S43). When it is immediately after YES is determined in step S42, NO is determined in step S43. If the main power supply switch 26 is not off (NO in step S43), the notification controller 32 determines whether or not the update timing has elapsed (step S44). When the update timing has not elapsed (NO in step S44), the processing by the notification controller 32 returns to step S43, and the determination of whether or not the main power supply switch 26 is off is repeatedly performed. Therefore, when the main power supply switch 26 is switched from on to off by the user within a predetermined time before the update timing of the firmware 22, the notification controller 32 can detect that.

If the update timing has elapsed without the main power supply switch 26 being switched from on to off (YES in step S44), the processing by the notification controller 32 ends. In this case, power supply from the main power supply to the main configuration part 10 is appropriately performed at the update timing. Therefore, the firmware 22 is normally updated by the firmware updating section 24 of the controller 11.

On the other hand, when the main power supply switch 26 is switched from on to off before the update timing (YES in step S43), the notification controller 32 executes a notification processing (step S45).

FIG. 8 is a flowchart illustrating an example of a detailed processing procedure of notification processing (step S45). Upon start of the notification processing, the notification controller 32 activates the notification section 34 to start providing notification to the user (step S50). For example, the notification section 34 outputs, from the speaker 34*a* to the user who has switched off the main power supply switch 26, a voice that prompts the user to switch on the main power supply switch 26. Further, the notification section 34 may perform notification to the user in a mode other than voice. The notification by the notification section 34 allows the user to be aware that the main power supply switch 26 should not be turned off, and to promptly turn on the main power supply switch 26.

Upon starting driving of the notification section 34, the notification controller 32 determines whether or not a predetermined time has elapsed (step S51). The predetermined time is, for example, about three minutes. If the predetermined time has not elapsed from the start of the notification (NO in step S51), the notification controller 32 determines whether the main power supply switch 26 is on (step S52). When the main power supply switch 26 is not turned on (NO in step S52), the processing by the notification controller 32 returns to step S51, and the notification is continued until a predetermined time elapses. When the predetermined time has elapsed (YES in step S51), the notification controller 32 stops the driving of the notification section 34 and ends the notification to the outside (step S53). In this case, the main power supply switch 26 might not be turned on because of the end of the notification. However, since the main power supply switch 26 has not been switched on although the notification has been provided continuously for the predetermined time after the main power supply switch 26 has been switched off by the user, it is highly likely that the user has already come home. Therefore, the notification controller 32 ends the notification in order to prevent consumption of the battery 35.

On the other hand, when the main power supply switch 26 is turned on before the predetermined time elapses (YES in step S52), the notification controller 32 stops the driving of the notification section 34 and ends the notification to the outside even when the predetermined time does not elapse (step S53). As a result, it is possible to prevent the useless notification from continuing and to minimize the consumption of the battery 35. Further, in this case, at the subsequent update timing, the power supply from the main power supply to the main configuration part 10 is appropriately performed. Therefore, the firmware 22 is normally updated by the firmware update section 24 of the controller 11. Thus, the notification processing (step S45) ends.

Returning to the flowchart of FIG. 7, when determining in step S42 that the main power supply switch is off (NO in step S42), the notification controller 32 determines whether or not the update timing has elapsed (step S46). When the update timing has not elapsed (NO in step S46), the processing by the notification controller 32 returns to step S42, and the determination of whether or not the main power supply switch 26 is on is repeatedly performed. Therefore, even if the main power supply switch 26 is off when the remaining time until the update timing reaches the predetermined time, the processing in steps S42 to S45 described above is executed if the main power supply switch 26 is turned on before the update timing elapses.

In contrast, when the update timing has elapsed without the main power supply switch 26 being turned on (YES in step S46), the processing by the notification controller 32 ends. In this case, since power is not supplied to the main configuration part 10 from the main power supply at the update timing, the firmware 22 is not updated.

Figure 9:
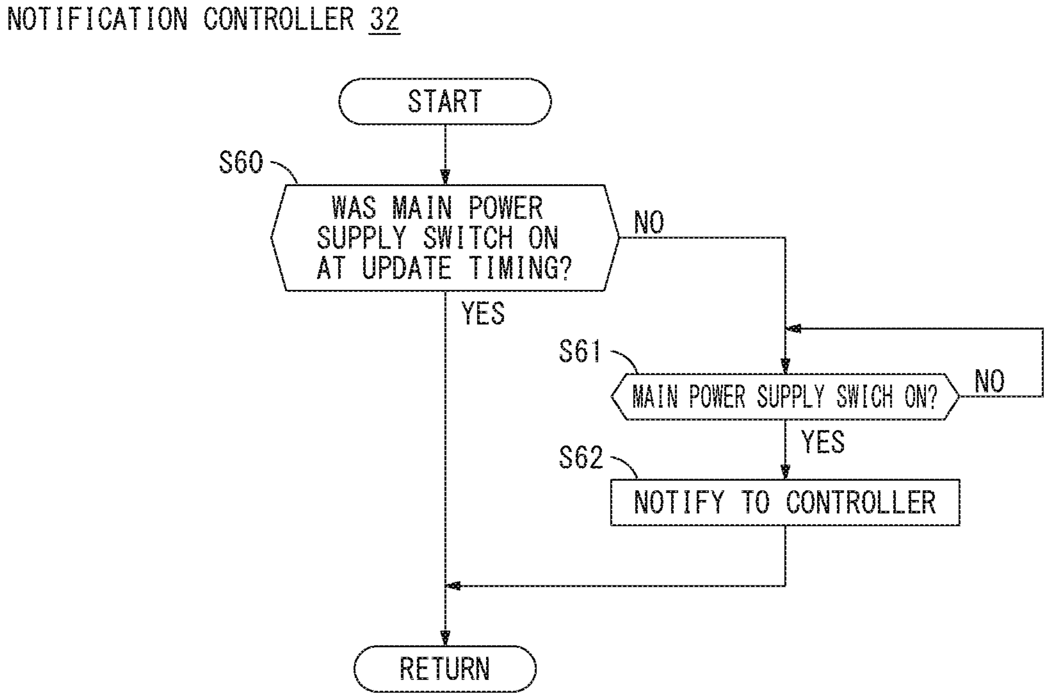
FIG. 9 is a flowchart illustrating processing when the main power supply switch is not turned on at the update timing.

Here, the notification controller 32 may perform the processing based on the flowchart illustrated in FIG. 9 after finishing all the processing based on the flowchart of FIG. 7. FIG. 9 is a flowchart illustrating processing performed when the main power supply switch 26 is not turned on at the update timing. Upon starting the processing based on the flowchart of FIG. 9, the notification controller 32 determines whether the main power supply switch 26 has been on at the update timing (step S60). If the main power supply switch 26 is on at the update timing (YES in step S60), the firmware 22 has been normally updated. Therefore, the notification controller 32 ends the processing without performing anything.

In contrast, if the main power supply switch 26 is off at the update timing (NO in step S60), the firmware 22 is not updated. Therefore, the notification controller 32 waits until the main power supply switch 26 is next turned on (step S61). When the main power supply switch 26 is turned on (YES in step S61), the notification controller 32 notifies the firmware update section 24 of the controller 11 that the update timing has elapsed without updating the firmware 22 (step S62). Thus, the firmware update section 24 recognizes that it has become impossible to perform the scheduled update of the firmware 22 after the start of the power supply from the main power supply. Therefore, the firmware update section 24 can display, on the display section of the operation panel 12, a message to the effect that the firmware 22 could not be updated, to notify the user or the administrator. Upon recognizing that the firmware 22 has not been able to be updated, the user or administrator may manually update the firmware 22.

As described above, the image forming apparatus 2 according to one or more embodiments includes the firmware updating section 24 that operates with power supply from the main power supply and updates the firmware 22 by executing the firmware update instruction provided from the external server 3, the main power supply switch 26 that turns on and off the main power supply, the detector 31 that detects switching of the main power supply switch 26, the battery 35 that is a power source different from the main power, and the notification controller 32 that operates with power supply from the battery 35 and provides a notification to the outside. The notification controller 32 is configured to, if the detector 31 detects that the main power supply switch 26 has been switched from on to off within a predetermined time period before the timing of updating the firmware 22 by the firmware update section 24, provide a notification to the outside. According to such a configuration, in a case where the main power supply switch 26 is switched from on to off by the user within a predetermined time before the update timing of the firmware 22, it is possible to prompt the user to turn on the main power supply switch 26. Therefore, power can be supplied from the main power supply to the firmware update section 24 at the update timing of the firmware 22 of the image forming apparatus 2, and the firmware 22 can be appropriately updated.

The embodiments of the present invention have been described above. However, the present invention is not limited to the content described in the above embodiments, and various modification examples are applicable.

For example, in the above-described embodiments, the case where the firmware update instruction is provided from the server 3 to the image forming apparatus 2 at the update timing of the firmware 22 has been exemplified. However, the provision of the firmware update instruction from the server 3 to the image forming apparatus 2 may be performed before the update timing. For example, the image forming apparatus 2 may acquire and store the firmware update instruction from the server 3 in advance, and read and execute the firmware update instruction when it is time to update the firmware 22.

Furthermore, in the example described in the above embodiments, if the main power supply switch 26 is switched from on to off within a predetermined time before the update timing of the firmware 22, the notification controller 32 activates the notification section 34 to provide a notification to the outside, so that the main power supply switch 26 is not turned off at the update timing of the firmware 22. However, the period for which whether or not the main power supply switch 26 has been switched from on to off is monitored is not limited to within the predetermined time before the update timing of the firmware 22. For example, when the firmware 22 is scheduled to be updated in the image forming apparatus 2, the notification controller 32 may constantly monitor whether or not the main power supply switch 26 has been switched from on to off, and when the main power supply switch 26 has been switched from on to off, may activate the notification section 34 to provide a notification to the outside. However, if the update timing of the firmware 22 is set to one week later, the main power supply switch 26 cannot be turned off by that time, and the expected power saving effect cannot be obtained. Therefore, as described in the above embodiments, the period for monitoring whether or not the main power supply switch 26 has been switched from on to off may be within a predetermined time before the update timing of the firmware 22.

Furthermore, in the example described in the above embodiments, whether the main power supply switch 26 has been switched from on to off is monitored when the firmware 22 is scheduled to be updated in the image forming apparatus 2. However, the condition for monitoring whether or not the main power supply switch 26 has been switched from on to off is not limited to the case where the firmware 22 is scheduled to be updated. For example, if the main power supply switch 26 is turned off by another user while the image forming apparatus 2 is receiving a print job of a specific user with a large number of printed sheets via the network 4, the print job being received cannot be executed. When a reserved job of a specific user is registered in the image forming apparatus 2, if the main power supply switch 26 is turned off by another user, the image forming apparatus 2 cannot execute the reserved job at the reserved execution date and time. Therefore, a configuration may be adopted in which, in a case where there is any scheduled execution in the image forming apparatus 2 without being limited to the update of the firmware 22, the notification controller 32 monitors whether or not the main power supply switch 26 has been switched from on to off, and in which, in a case where the main power supply switch 26 has been switched from on to off, the notification controller 32 activates the notification section 34 to perform notification.

The above embodiments illustrate the case where the battery 35 is a primary battery. However, the battery 35 is not limited to a primary battery, and may be a secondary battery. For example, in a case where the battery 35 is a secondary battery, a configuration may be adopted in which the battery 35 is charged with power supply from the main power supply when the main power supply switch 26 is on. Thus, the frequency of replacement of the battery 35 can be reduced.

In the above-described embodiments, as an example, an example in which the main power supply switch 26 is provided on the front side of the apparatus main body of the image forming apparatus 2 at a position where the main power supply switch 26 can be operated by the user when the front door 2*a* is opened has been described. In this case, when a user attempts to switch the main power supply switch 26 from on to off, the user first opens the front door 2*a*. Therefore, the image forming apparatus 1 may be further equipped with a sensor to detect that the front door 2*a* has been opened. In the image forming apparatus 1, in a case where the opening of the front door 2*a* is detected by the sensor, the controller 11 may perform the first notification (first notification) before the main power supply switch 26 is switched from on to off by the user. For example, when there is some execution schedule in the image forming apparatus 2, such as updating of the firmware 22, if the front door 2*a* is opened by the user, the controller 11 displays a message indicating that the main power supply switch 26 should not be turned off on the display section of the operation panel 12. Thus, the user can grasp that the main power supply switch 26 should not be turned off before the main power supply switch 26 is switched from on to off. However, even if the above-described display is provided on the operation panel 12, the main power supply switch 26 may be switched from on to off by the user. In that case, as described in the above embodiments, notification (second notification) by the notification circuit 30 is performed.

The above embodiments are described with the example in which the instructions to be executed by the processor 36 of the notification circuit 30 is stored in advance in the ROM37. However, the instructions are not limited to a program stored in advance in the image forming apparatus 2. That is, the instructions may be a transaction target by themselves. In this case, the instructions may be provided in a downloadable form via a network such as the Internet, or may be provided in a state of being recorded on a non-transitory computer-readable recording medium such as a CD-ROM.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
- a main power supply switch that turns on and off a main power supply;
- a battery that is a power source different from the main power supply;
- a detector that detects switching of the main power supply switch;
- a display;
- a notification unit that is configured independently from the display;
- a first hardware processor that:
  - operates with power supplied from the battery,
  - in response to the detector detecting the switching of the main power supply switch from on to off, drives the notification unit to continuously issue an external warning notification from the notification unit for a predetermined time to a user of the image forming apparatus to indicate that the main power supply switch has been turned off, and
  - in response to the detector detecting the switching of the main power supply switch from off to on while the external warning notification is being issued, stops the driving of the notification unit to terminate the external warning notification; and
- a second hardware processor that updates firmware by executing a firmware update instruction provided from an external server, wherein
- in response to the detector detecting the main power supply switch being off at an update timing of the firmware, the first hardware processor awaits till the main power supply switch is turned on, and
- once the main power supply switch is turned on, the first hardware processor notifies, via the display, that the update timing has elapsed without updating the firmware.

2. The image forming apparatus according to claim 1, wherein
- in response to a predetermined processing being scheduled to be performed with power supplied from the main power supply, the first hardware processor issues the external warning notification based on a detection result of the detector.

3. The image forming apparatus according to claim 1, wherein:
- the second hardware processor that:
  - operates with power supplied from the main power supply, wherein
- the first hardware processor issues the external warning notification in response to the detector detecting the switching of the main power supply switch from on to off within a predetermined time period before the update timing of the firmware.

4. The image forming apparatus according to claim 3, further comprising:
- a storage that:
  - operates by the power supplied from the battery, and
  - stores update information designating the update timing.

5. The image forming apparatus according to claim 1, wherein
- the notification unit operates by the power supplied from the battery.

6. The image forming apparatus according to claim 1, wherein
- the notification unit includes a speaker that outputs a sound.

7. The image forming apparatus according to claim 1, wherein the notification unit includes a speaker that outputs a sound prompting a user to turn on the main power switch.

8. The image forming apparatus according to claim 1, wherein the notification unit includes a light emitter that emits light.

9. The image forming apparatus according to claim 1, wherein the notification unit includes a vibrator that generates vibration and transmits a vibration sound.

10. The image forming apparatus according to claim 1, wherein the notification unit includes a communication interface that notifies a pre-specified external device that the main power supply switch has been turned off.

11. A control method for an image forming apparatus that comprises: a main power supply switch that turns on and off a main power supply; a battery that is a power source different from the main power supply; a detector that detects switching of the main power supply switch; a display; a notification unit that is configured independently from the display; a first hardware processor that operates with power supplied from the battery; and a second hardware processor that updates firmware by executing a firmware update instruction provided from an external server, the method comprising:

in response to the detector detecting the switching of the main power supply switch from on to off, with power supplied from the battery, driving the notification unit to continuously issue an external warning notification from the notification unit for a predetermined time to a user of the image forming apparatus to indicate that the main power supply switch has been turned off, in response to the detector detecting the switching of the main power supply switch from off to on while the external warning notification is being issued, stopping the driving of the notification unit to terminate the external warning notification;

in response to the detector detecting the main power supply switch being off at an update timing of the firmware, awaiting till the main power supply switch is turned on; and once the main power supply switch is turned on, notifying, via the display, that the update timing has elapsed without updating the firmware.

12. A control method for an image forming apparatus that comprises: a main power supply switch that turns on and off a main power supply; a battery that is a power source different from the main power supply; a detector that detects switching of the main power supply switch; a display; a notification unit that is configured independently from the display; a first hardware processor that operates with power supplied from the battery; and a second hardware processor that updates firmware by executing a firmware update instruction provided from an external server, the method comprising:

acquiring update information designating an update timing of firmware;

in response to the detector detecting the switching of the main power supply switch from on to off within a predetermined time period before the update timing, with power supplied from the battery, driving the notification unit to continuously issue an external warning notification from the notification unit for a predetermined time to a user of the image forming apparatus to indicate that the main power supply switch has been turned off;

in response to the detector detecting the switching of the main power supply switch from off to on while the external warning notification is being issued, stopping the driving of the notification unit to terminate the external warning notification;

with power supplied from the main power supply, updating the firmware by executing the firmware update instruction at the update timing; and in response to the detector detecting the main power supply switch being off at the update timing, awaiting till the main power supply switch is turned on, and once the main power supply switch is turned on, notifying, via the display, that the update timing has elapsed without updating the firmware.

13. A non-transitory computer-readable recording medium storing instructions to be executed by a hardware processor in an image forming apparatus comprising: a main power supply switch that turns on and off a main power supply; a battery that is a power source different from the main power supply; a detector that detects switching of the main power supply switch; a display; a notification unit that is configured independently from the display; a first hardware processor that operates with power supplied from the battery; and a second hardware processor that updates firmware by executing a firmware update instruction provided from an external server, the instructions causing the hardware processor to execute:

operating with power supplied from the battery;

in response to the detector detecting the switching of the main power supply switch from on to off, driving the notification unit to continuously issue an external warning notification from the notification unit for a predetermined time to a user of the image forming apparatus to indicate that the main power supply switch has been turned off;

in response to the detector detecting the switching of the main power supply switch from off to on while the external warning notification is being issued, stopping the driving of the notification unit to terminate the external warning notification;

in response to the detector detecting the main power supply switch being off at an update timing of the firmware, awaiting till the main power supply switch is turned on; and once the main power supply switch is turned on, notifying, via the display, that the update timing has elapsed without updating the firmware.

14. The image forming apparatus according to claim 1, wherein the display is an operation panel, and the notification unit comprises at least one of a speaker, light emitter, and vibrator.

* * * * *